United States Patent [19]

Seki

[11] Patent Number: 5,119,304
[45] Date of Patent: Jun. 2, 1992

[54] METHOD AND APPARATUS FOR CONTROLLING ENGINE IN ENGINE CHARACTERISTICS TEST

[75] Inventor: Yoshiro Seki, Tokyo, Japan

[73] Assignee: Kabushiki Kaisha Toshiba, Kawasaki, Japan

[21] Appl. No.: 534,637

[22] Filed: Jun. 7, 1990

[30] Foreign Application Priority Data

Jun. 9, 1989 [JP] Japan .................................. 1-145458

[51] Int. Cl.[5] ........................ G01L 5/13; G01M 15/00
[52] U.S. Cl. ............................... 364/431.05; 364/425; 364/579; 364/161; 364/551.01; 73/117.3; 73/862.18
[58] Field of Search .................. 73/116, 117.3, 862.13, 73/862.17, 862.18; 364/431.01, 431.03, 431.04, 431.05, 551.01, 579, 148, 160–163, 425

[56] References Cited

U.S. PATENT DOCUMENTS

| | | | |
|---|---|---|---|
| 4,257,261 | 3/1981 | Ono et al. | 73/862.18 |
| 4,306,449 | 12/1981 | Hoffman | 73/116 |
| 4,442,708 | 4/1984 | Gable et al. | 73/862.18 X |
| 4,457,182 | 7/1984 | McFarland | 73/862.18 |
| 4,656,576 | 4/1987 | Kawarabayashi | 364/148 |
| 4,758,967 | 7/1988 | Shmuter et al. | 364/579 X |
| 4,995,139 | 2/1991 | Suzuki | 73/116 |

FOREIGN PATENT DOCUMENTS

| | | |
|---|---|---|
| 0169528 | 1/1986 | European Pat. Off. . |
| 54-129274 | 3/1978 | Japan . |
| 57-198341 | 5/1981 | Japan . |
| 1-080742 | 9/1987 | Japan . |

OTHER PUBLICATIONS

Koustas, et al., "A Transient Diesel Test Bed with Direct Digital Control", SAE Technical Paper Series 840347, International Congress & Exposition, Detroit Mich., Feb. 27, 1987–Mar. 2, 1984, pp. 1–16.
Cassidy, Jr., et al., "On the Design of Electronic Automotive Engine Controls using Linear Quadratic Control Theory", IEEE Transactions on Automatic Control, vol. AC-25, No. 5, Oct. 1980, pp. 901–912.
Fuji, "A New Approach to the LQ Design from the Viewpoint of the Inverse Regulator Problem", IEEE Transactions on Automatic Control, vol. AC-32, No. 11, Nov. 1987, pp. 995–1004.

Primary Examiner—Parshotam S. Lall
Assistant Examiner—Thomas S. Auchterlonie
Attorney, Agent, or Firm—Foley & Lardner

[57] ABSTRACT

A method and an apparatus for controlling an engine system in an engine characteristic test capable of accurately performing controlling operations. In the apparatus rotational speed, axial torque, and operational energy of the engine as well as rotational speed of a dynamometer are detected. The operational energy of the engine is controlled by an engine controller. A predetermined rotational speed of the engine and a predetermined axial torque of the dynamometer are set. A first difference between the predetermined rotational speed and the detected rotational speed of the dynamometer as well as a second difference between the predetermined axial torque and the detected axial torque of the engine are calculated. Controlled gains based on a predetermined mathematical model corresponding to the engine system are calculated from the detected operational energy, the detected axial torque and the detected rotational speed of the engine and the detected rotational speed of the dynamometer. Manipulated variables to perform at least integral and proportional operations are calculated from the control gains; the detected operational energy and the detected axial torque of the engine; The calculated first difference and the calculated second difference, the engine controller and the dynamometer are controlled by a system controller according to the calculated manipulated variable.

10 Claims, 4 Drawing Sheets

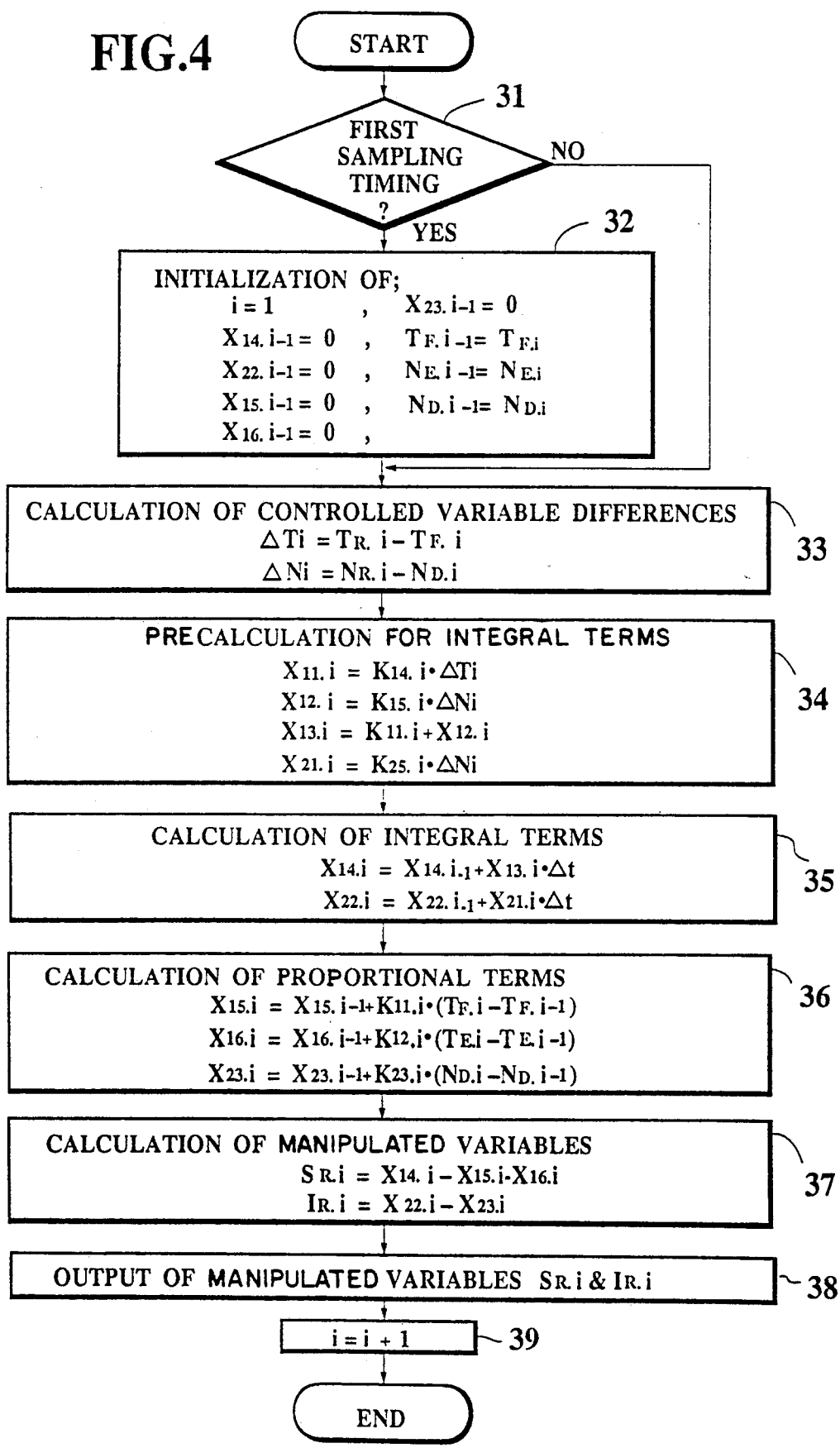

METHOD AND APPARATUS FOR CONTROLLING ENGINE IN ENGINE CHARACTERISTICS TEST

BACKGROUND OF THE INVENTION

1. Field of the Invention

The present invention relates to a method and an apparatus for controlling the operaton of an engine in an engine characteristics test to be performed in an experimental room.

2. Description of the Background Art

A test of engine characteristics such as engine noise or amount of exhaust is usually conducted inside an experimental room, because of the difficulty of collecting data on a running car, which is carrying engine.

In such a test, engine axial torque and a rotational speed are controlled at prescribed values by adjusting throttle valve opening of the engine and dynamometer current of dynamometer associated with the engine.

An example of a conventional apparatus for performing such an engine test is shown in FIG. 1.

In this apparatus, an operator enters reference values for the axial torque and the rotational speed at operation command generator 1, and reference signals indicating these reference values are subsequently output to substractors 4a and 4b.

Meanwhile, an engine 2 to be tested is equipped with a rotational speed detector 3 from which a measured value for the rotational speed is fed back to the substractor 4a, so that the subtractor 4a calculates a difference between the measured value and the reference value for the rotational speed.

This difference obtained by the subtractor 4a is then fed to an engine controller 5 which performs a control operation to nullify the difference by generating a throttle valve control signal to appropriately adjust a throttle controller 6 connected to a throttle valve (not shown) of the engine 2.

On the other hand, the engine 2 is also equipped with an axial torque detector 7 from which a measured value for the axial torque is fed back to the substractor 4b, so that the subtractor 4b calculates a difference between the measured value and the reference value for the axial torque.

This difference obtained by the subtractor 4b is then fed to a dynamometer controller 8 which performs a control operation to nullify the difference by generating dynamometer current control signal to appropriately adjust dynamometer current controller 9 connected to a dynamometer 10.

In this manner, the rotational speed and the axial torque of the engine 2 are adjusted in correspondence with various driving conditions, such that the data concerning characteristics of the engine 2 under various driving conditions can be obtained.

However, in such a conventional apparatus for performing an engine test, the system for controlling the rotational speed by the adjustment of the throttle valve opening, and the system for controlling the axial torque by adjusting the dynamometer current are completely independent of each other. In other words, each system is operating as a single-input single-output system, so that it has been impossible to control these systems with mutual interference between these systems taken into account. For this reason, it has been difficult to stabilize the rotational speed and the axial torque simultaneously, so that a highly accurate test of engine characteristics has been impossible.

SUMMARY OF THE INVENTION

It is therefore an object of the present invention to provide a method and an apparatus for controlling an engine in an engine characteristics test capable of performing the controlling operations highly accurately by taking mutual interference between more than one control system into account.

According to one aspect of the present invention there is provided an apparatus for controlling an engine system in an engine characteristic test by performing at least integral and proportional control operations, the engine system including an engine for generating operational energy and a dynamometer connected to the engine for generating power energy, the apparatus comprising: a unit for detecting rotational speed of the engine; a unit for detecting axial torque of the engine; a unit for detecting operational energy of the engine; a unit for detecting rotational speed of the dynamometer; a engine control unit for controlling the operational energy of the engine; a unit for setting a predetermined rotational speed of the engine and a predetermined axial torque of the dynamometer; a unit for calculating a first difference between the predetermined rotational speed and the detected rotational speed of the dynamometer, and a second difference between the predetermined axial torque and the detected axial torque of the engine; a unit for calculating controlled gains based on a predetermined mathematical model coresponding to the engine system, from the detected operational energy, the detected axial torque and the detected rotational speed of the engine and the detected rotational speed of the dynamometer; a unit for calculating manipulated variables to perform at least internal and proportional operations, from the control gains, the detected operational energy and the detected axial torque of the engine, the calculated first difference and the calculated second difference; and a system control unit for controlling the engine control unit and the dynamometer according to the calculated manipulated variables.

According to another aspect of the present invention there is provided a method of controlling an engine system in a engine characteristic test by performing at least integral and proportional control operations, the engine system including an engine for generating operational energy and a dynamometer connected to the engine for generating power energy, the method comprising the steps of: detecting rotational speed of the engine; detecting axial torque of the engine; detecting operational energy of the engine; detecting rotational speed of the dynamometer; controlling the operational energy of the engine by an engine control unit; setting a predetermined rotational speed of the engine and a predetermined axial torque of the dynamometer; calculating a first difference between the predetermined rotational speed and the detected rotational speed of the dynamometer, and a second difference between the predetermined axial torque and the detected axial torque of the engine; claculating controlled gains based on a predetermined mathematical model, corresponding to the engine system, from the detected operational energy, the detected axial torque and the detected rotational speed of the engine and the detected rotational speed of the dynamometer; calculating manipulated variables to perform at least integral and proportional operations from the control gains, the detected operational energy and the detected axial torque of the engine, the calculated first difference and the calculated second difference; and controlling the engine control unit and the dynamometer by a system control unit according to the calculated manipulated variables.

Other features and advantages of the present invention will become apparent from the following descriptin taken in conjunction with the accompanying drawings.

BRIEF DESCRIPTION OF THE DRAWINGS

FIG. 4 is a flow chart for another part of a control operation to be performed by the apparatus of FIG. 2.

DETAILED DESCRIPTION OF THE PREFERRED EMBODIMENTS

Figure 1:
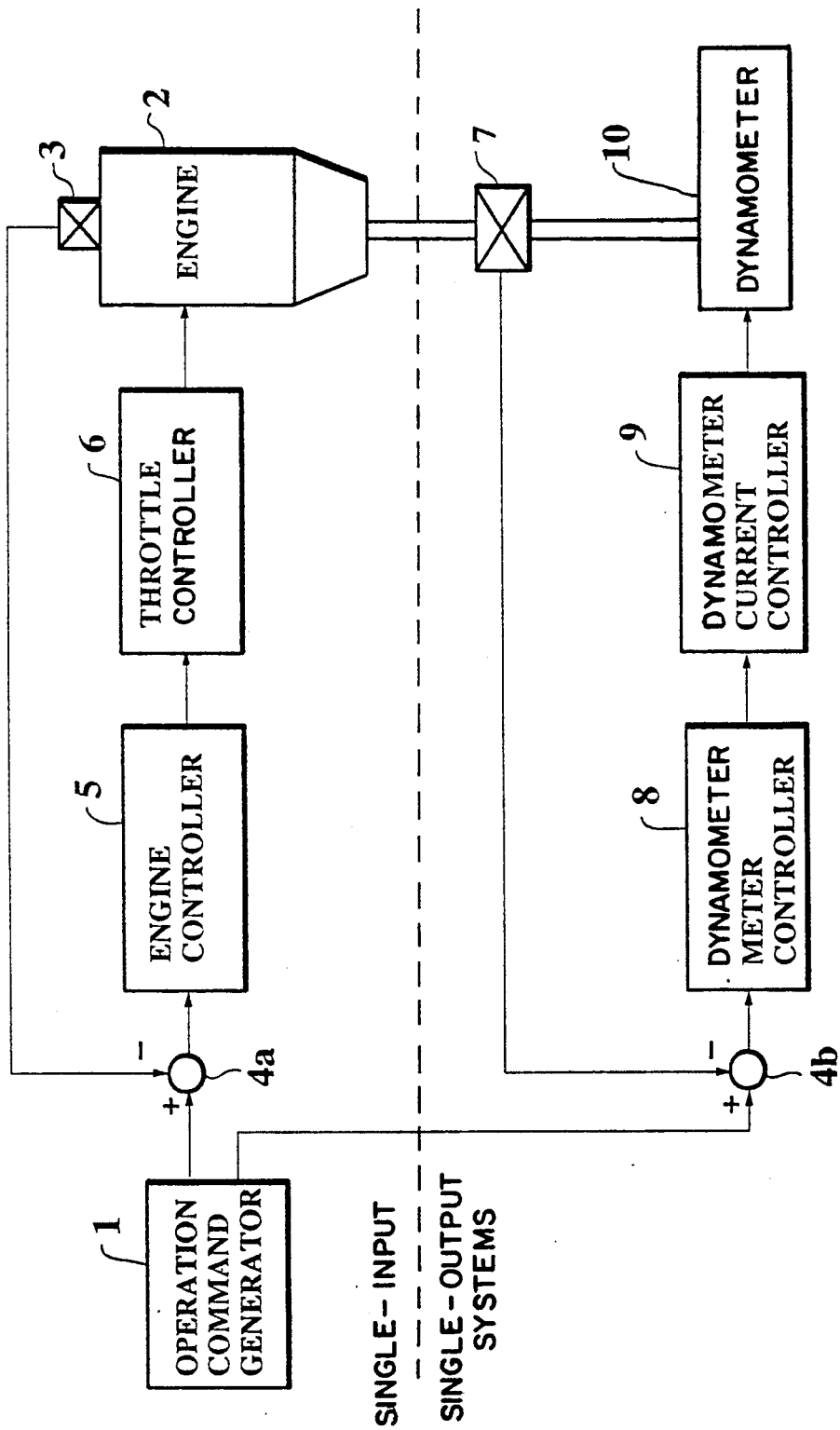
FIG. 1 is a schematic block diagram for a conventional apparatus for testing an engine.
Figure 2:
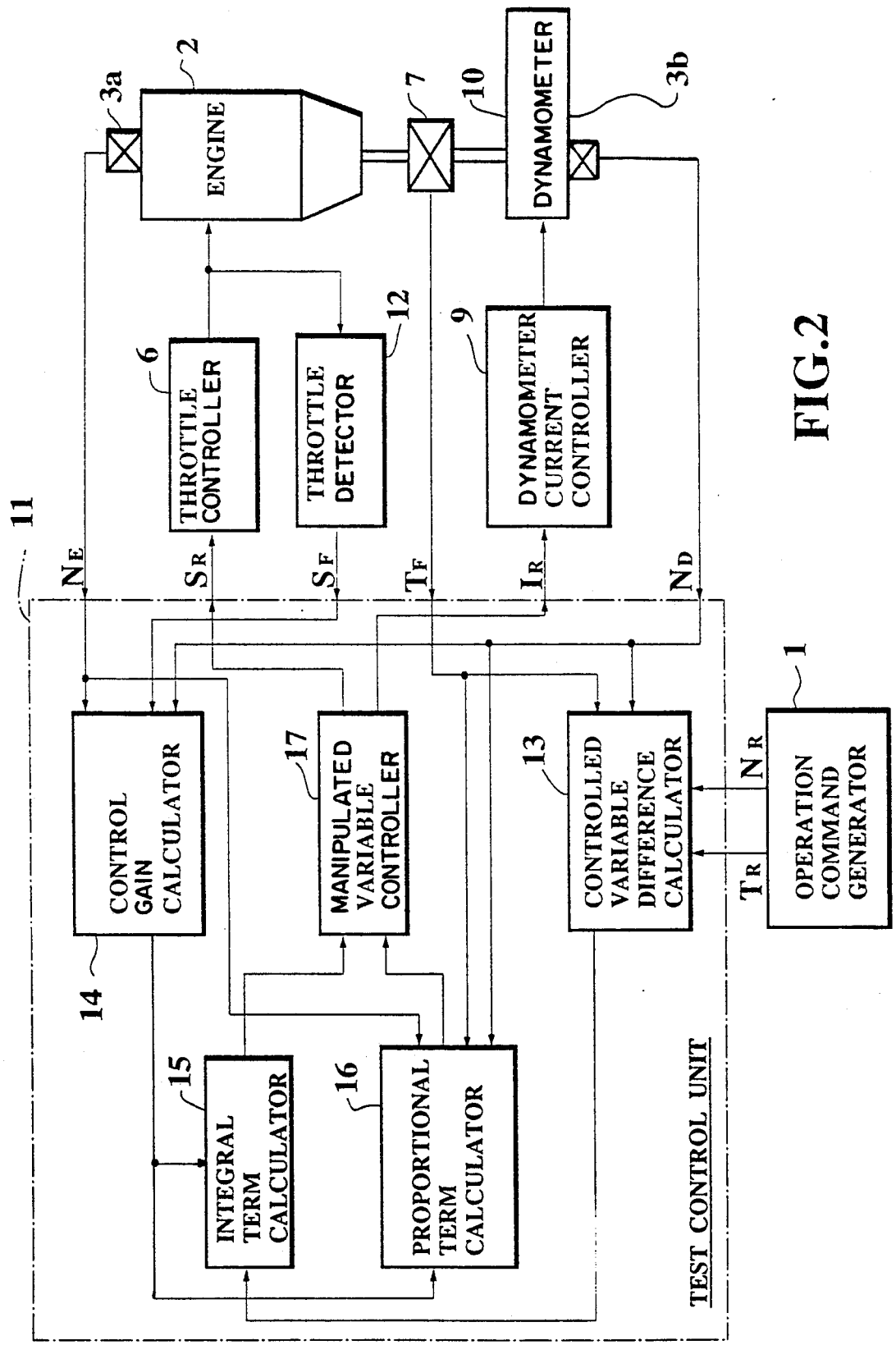
FIG. 2 is a schematic block diagram for one embodiment of an apparatus for testing an engine according to the present invention.

Referring now to FIG. 2, there is shown one embodiment of an apparatus for testing an engine according to the present invention.

In this embodiment, an engine 2 to be tested is equipped with a rotational speed detector 3a to measure a rotational speed $N_E$ of the engine 2, an axial torque detector 7 for measuring axial torque $T_F$, a throttle controller 6 for adjusting an opening of a throttle valve (not shown) of the engine 2, and a throttle detector 12 for measuring an opening of the throttle valve $S_F$. On the other hand, a dynamometer 10 connected with the engine 2 is equipped with a rotational speed detector 3b for measuring a rotational speed $N_D$ of the dynamometer 10, and a dynamometer current controller 9 for adjusting a dynamometer current to be supplied to the dynamometer 10.

the rotational speed $N_E$ of the engine 2, the axial torque $T_F$, the opening of the throttle valve $S_F$, and the rotational speed $N_D$ of the dynamometer 10 are fed to a test control unit 11, while the throttle controller 6 and the dynamometer current controller 9 are controlled by a throttle valve opening reference value $S_R$ and a dynamometer current reference value $I_R$ from the test control unit 11, respectively, which are obtained such that the opening of the throttle valve and the dynamometer current are adjusted appropriately to be equal to reference values $T_R$ and $N_R$ for the opening of the throttle valve and the dynamometer current entered by an operator at an operation command generator 1.

The test control unit 11 comprises a controlled variable difference calculator 13 for calculating controlled variable differences betweeen the measured values and the reference values for controlled variables, which in this case are the opening of the throttle valve and the dynamometer current; a control gain calculator 14 for calculating control gains from the measured values of rotational speed $N_E$ of the engine 2, the opening of the throttle valve $S_F$, and the rotational speed $N_D$ of the dynamometer 10 in accordance with a prescribed mathematical model; an integral term calculator 15 for calculating an integral term for PID (proportional-integral-derivative) type control from the control gains obtained by the control gain calculator 14 and the controlled variable differences obtained by the controlled variable difference calculator 13; a proportional term calculator 16 for calculating a proportional term for PID type control from the control gains obtained by the control gain calculator 14, the measured values of the rotational speed $N_E$ of the engine 2, the opening of the throttle valve $S_F$, and the rotational speed $N_D$ of the dynamometer 10; and a manipulated variable controller 17 for calculating the throttle opening reference value $S_R$ and a dynamometer current reference value $I_R$ from the integral term and the proportional term.

Now, the mathematical model to be used in this embodiment will be described in detail.

In this embodiment, a system of the engine 2 and the dynamometer 10 is expressed by a model given by the following equations (1) to (8):

$$dX/dt = A \cdot X + B \cdot U \tag{1}$$

$$Y = C \cdot X \tag{2}$$

$$A = \begin{pmatrix} 0 & K_{SH} & K_{SH} \\ -1/J_E & -K_N & 0 \\ -1/J_D & 0 & 0 \end{pmatrix} \tag{3}$$

$$B = \begin{pmatrix} 0 & 0 \\ K_E/J_E & 0 \\ 0 & \phi/J_D \end{pmatrix} \tag{4}$$

$$C = \begin{pmatrix} 1 & 0 & 0 \\ 0 & 0 & -1 \end{pmatrix} \tag{5}$$

$$X = (T_{SH} N_E N_D)^T \tag{6}$$

$$U = (S_R I_R)^T \tag{7}$$

$$Y = (T_{SH} N_D)^T \tag{8}$$

where $T_{SH}$ is the axial torque of the engine 2, $N_E$ is the measured rotational speed of the engine 2, $N_D$ is the measured rotational speed of the dynamometer 10, $S_R$ is the throttle opening reference value, $I_R$ is the dynamometer current reference value, $K_{SH}$ is a torsional rigidity coefficient of a connecting axle, $J_E$ is a moment of inertia of the engine 2, $K_N$ is a coefficient indicating a variation of generated engine torque corresponding to a variation of the rotational speed of the engine 2, $K_E$ is a coefficient indicating a variation of generated engine torque corresponding to a variation of the throttle valve opening, $\phi$ is a back electromotive force coefficient of the dynamometer 10, and $J_D$ is a moment of inertia of the dynamometer 10.

Here, a vector U given by the equation (7) above can also be expressed by using the control gain matrix $K_D$ as follows:

$$dU/dt = -K_D X_D \tag{9}$$

where $$X_D = (dX^T/dt (Y-R)^T)^T \tag{10}$$

in which R represents a prescribed reference value for the controlled variable.

Now, an inverse problem of a linear optimal control is to obtain a state feedback which minimizes a function for evaluating a response of the engine 2, which is explained in detail in T. Fujii, "New approach to the LQ design from the viewpoint of the inverse regulator problem", IEEE transactions on automatic control, Vol. AC-32, No. 11, November 1987. According to this reference, the control gain matrix $K_D$ appearing in the equation (9) above can be expressed in terms of an appropriate regular matrix V, a regular constant diagonal $\Sigma = \text{diag}(\sigma_1, \sigma_2)$, and an appropriate matrix F as follows:

$$K_D = V^{-1} \cdot \Sigma \cdot V \cdot (FI) \cdot \Gamma^{-1} \quad (11)$$

where $$\Gamma = \begin{pmatrix} A & B \\ C & 0 \end{pmatrix} \quad (12)$$

When this theory is applied to the model described by the equations (1) and (2) above, the control gain matrix $K_D$ can be expressed as follows:

$$K_D = \begin{pmatrix} K_{11} & K_{12} & 0 & K_{14} & K_{15} \\ 0 & 0 & K_{23} & 0 & K_{25} \end{pmatrix} \quad (13)$$

$$K_{11} = f_{11}(J_E, K_{SH}, K_E, W_{C,TC}) \quad (14a)$$

$$K_{12} = f_{12}(J_E, K_E) \quad (14b)$$

$$K_{14} = f_{14}(J_E, K_{SH}, K_E, W_{C,TC}) \quad (14c)$$

$$K_{15} = f_{15}(J_E, K_E, W_{C,SC}) \quad (14d)$$

$$K_{23} = f_{23}(J_D, \phi) \quad (14e)$$

$$K_{25} = f_{25}(J_E, \phi, W_{C,SC}) \quad (14f)$$

where $W_{C,TC}$ is a target response of the torque control, $W_{C,SC}$ is a target response of the rotational speed control of the engine, f( ) designates an appropriate function of the arguments inside the bracket, and $K_{11}$, $K_{12}$, $K_{14}$, $K_{15}$, $K_{23}$, and $K_{25}$ are the control gains.

The control gain matrix $K_D$ so obtained, however, is applicable only to an object to be controlled which possesses a linear characteristic, so that it is not directly applicable to the engine 2, whose response characteristic is known to be nonlinear.

Nevertheless, by specifying a coefficient $K_E$, which is a coefficient indicating a variation of generated engine torque corresponding to a variation of the throttle valve opening, and a coefficient $\phi$, which is a back electromotive force coefficient of the dynamometer 10, both of which vary in accordance with the nonlinear characteristic of the engine 2 and the dynamometer 10, the control gain matrix $K_D$ can be determined.

In this embodiment, the coefficient $K_E$ is determined from a static characteristic of the engine 2 as follows. Namely, the generated engine torque $T_E$ can be given as a function of the throttle valve opening $S_F$ and the rotational speed $N_E$ of the engine 2 by the following expression:

$$T_E = f(N_E, S_F) \quad (15)$$

which can be determined from the designed values or the measured values. Then, the coefficient $K_E$ can be obtained from this generated engine torque $T_E$ by using the following expression:

$$K_E = \{f(N_E, S_F + a) - f(N_E, S_F - a)\}/(2 \cdot a) \quad (16)$$

where a is a constant. Thus, the coefficient $K_E$ indicating a variation of generated engine torque corresponding to a variation of the throttle valve opening can be determined from measured throttle valve opening $S_F$ and the measured rotational speed $N_E$ of the engine 2.

As for the back electromotive force coefficient $\phi$ of the dynamometer 10, this can be determined from the rotational speed $N_D$ of the dynamometer 10 as follows. Namely, the back electromotive force coefficient $\phi$ can be given by:

$$\phi = f(N_D, P, I_B) \quad (17)$$

where $N_D$ is the rotational speed of the dynamometer 10, P is a rated power of the dynamometer 10, and $I_B$ is a rated current of the dynamometer 10. Since the rated power P and the rated current $I_B$ are constant values, the back electromotive force coefficient $\phi$ can be determined from the measured rotational speed $N_D$ of the dynamometer 10.

Thus, putting these together, the control gain matrix $K_D$ can be determined from the measured throttle valve opening $S_F$, the measured rotational speed $N_E$ of the engine 2, and the measured rotational speed $N_D$ of the dynamometer 10.

In accordance with this model, the apparatus of FIG. 2 operates as follows.

First, as the operation begins, the rotational speed $N_E$ of the engine 2 detected by the rotational speed detector 3a, the axial torque $T_F$ detected by the axial torque detector 7, the opening of the throttle valve $S_F$, detected by the throttle opening detector 12, and the rotational speed $N_D$ of the dynamometer 10 detected by the rotational speed detector 3b are fed to a test control unit 11, which are taken into the test control unit 11 at predetermined sampling timings.

Figure 3:
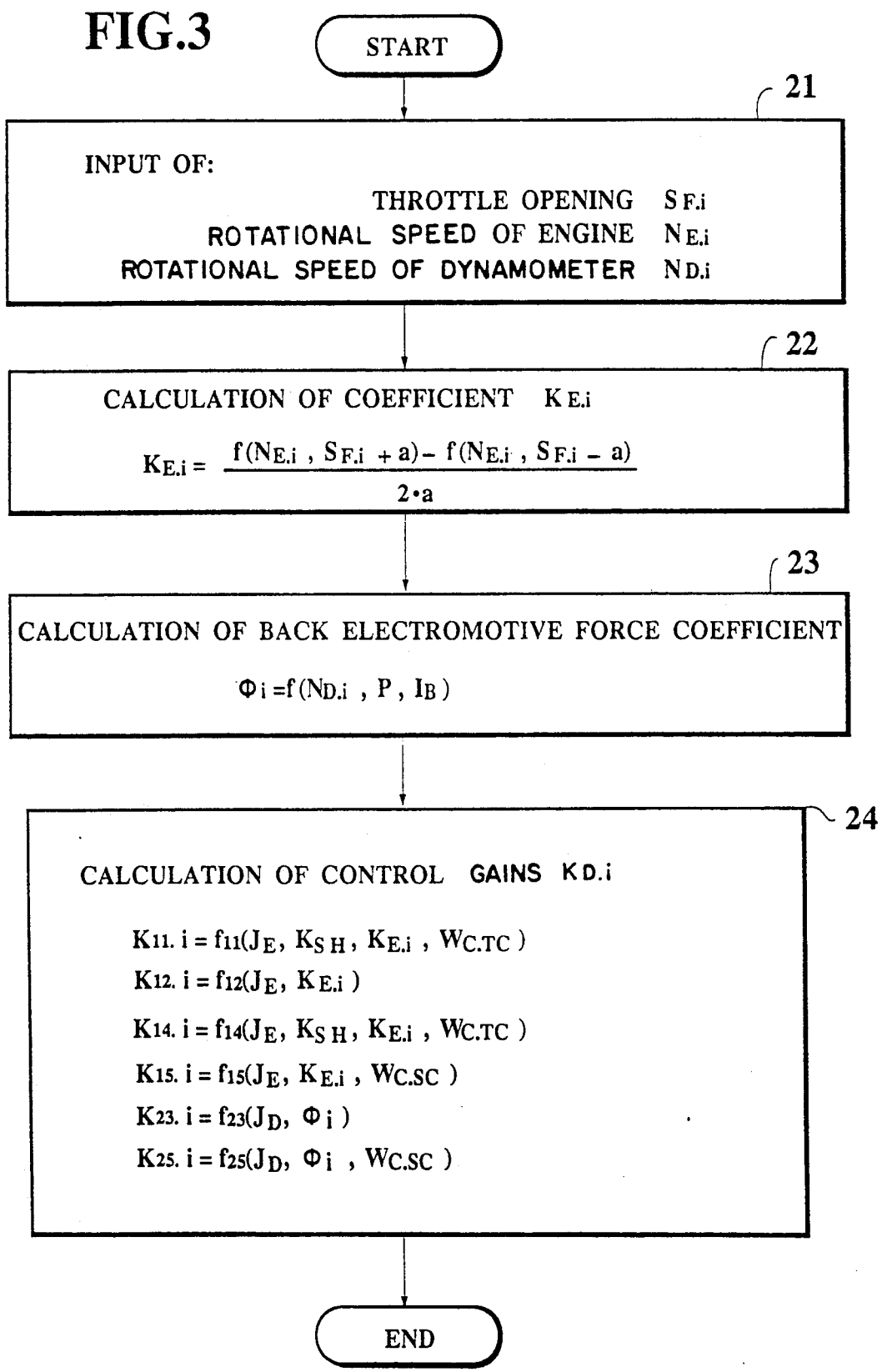
FIG. 3 is a flow chart for a part of a control operation to be performed by the apparatus of FIG. 2.

Then, in the test control unit 11, the control gain calculator 14 calculates the control gains $K_{11,i}$, $K_{12,i}$, $K_{14,i}$, $K_{15,i}$, $K_{23,i}$, and $K_{25,i}$ of the control gain matrix $K_{D,i}$ for the i-th sampling timing according to the flow chart of FIG. 3, as follows.

First, at the step 21, the rotational speed $N_{E,i}$ of the engine 2, the opening of the throttle valve $S_{F,i}$, and the rotational speed $N_{D,i}$ of the dynamometer 10 at the i-th sampling timing are taken in.

Then, at the steps 22 and 23, these values for $N_{E,i}$, $S_{F,i}$, and $N_{D,i}$ are substituted into the equations (16) and (17), respectively, so as to obtain the coefficient $K_{E,i}$ indicating a variation of generated engine torque corresponding to a variation of the throttle valve opening, and the back electromotive force coefficient $\phi_i$ of the dynamometer 10, respectively.

Then, at the step 24, the obtained coefficients $K_{E,i}$ and $\phi_i$ are substituted into the equations (14a) to (14f), so as to obtain the control gains $K_{11,i}$, $K_{12,i}$, $K_{14,i}$, $K_{15,i}$, $K_{23,i}$, and $K_{25,i}$ of the control gain matrix $K_{D,i}$.

The control gain matrix $K_{D,i}$ so obtained is subsequently fed to the integral term calculator 15 and the proportional term calculator 16.

From this control gain matrix $K_{D,i}$, the manipulated variables such as the throttle opening reference value $S_{R,i}$ and the dynamometer current reference value $I_{R,i}$ are obtained by the test control unit 11, according to the flow chart of FIG. 4, as follows.

First, if it is determined to be the first sampling timing at the step 31, then at the step 32, various data to be used are initialized to initial values as follows:

$$i = 1$$
$$X_{14,i-1} = 0$$
$$X_{22,i-1} = 0$$
$$X_{15,i-1} = 0$$
$$X_{16,i-1} = 0$$
$$X_{23,i-1} = 0$$
$$T_{F,i-1} = T_{F,i}$$
$$N_{E,i-1} = N_{E,i}$$
$$N_{D,i-1} = N_{D,i}$$

where $X_{14}$, $X_{22}$, $X_{15}$, $X_{16}$, and $X_{23}$ are variables to be utilized in a course of the subsequent calculations. If it is not the first sampling timing, this initialization at the step 32 is skipped.

Next, at the step 33, a torque difference $\Delta T_i$ and a rotational speed difference $\Delta N_i$ are calculated by the controlled variable difference calculator 13 from the reference values $N_{R,i}$ and $T_{R,i}$ for the rotational speed and the axial torque entered from the operation command generator 1 and the measured values of the rotational speed $N_{D,i}$ of the dynamometer 10 and the axial torque $T_{F,i}$, as follows:

$$\Delta T_i = T_{R,i} - T_{F,i} \quad (18)$$

$$\Delta N_i = N_{R,i} - N_{D,i} \quad (19)$$

These differences obtained are then fed to the integral term calculator 15, at which variables $X_{11,i}$, $X_{12,i}$, $X_{13,i}$, and $X_{21,i}$ are calculated at the step 34 as follows:

$$X_{11,i} = K_{14,i} \Delta T_i \quad (20)$$

$$X_{12,i} = K_{15,i} \Delta N_i \quad (21)$$

$$X_{13,i} = X_{11,i} + X_{12,i} \quad (22)$$

$$X_{21,i} = K_{25,i} \Delta N_i \quad (23)$$

from which the integral terms $X_{14,i}$ and $X_{22,i}$ are also obtained by the integral term calculator 15 at the step 35 as follows:

$$X_{14,i} = X_{14,i-1} + X_{13,i} \Delta t \quad (24)$$

$$X_{22,i} = X_{22,i-1} + X_{21,i} \Delta t \quad (25)$$

where $\Delta t$ is a control interval.

The integral term $X_{14,i}$ obtained by the equation (24) and the integral term $X_{22,i}$ obtained by the equation (25) are then fed to the manipulated variable calculator 17.

On the other hand, at the step 36, the proportional term calculator 16 calculates the variables $X_{15,i}$, $X_{16,i}$, and $X_{23,i}$ from the measured values of the rotational speed $N_{E,i}$ of the engine 2, the axial torque $T_{F,i}$, and the rotational speed $N_{D,i}$ of the dynamometer 10 as follows:

$$X_{15,i} = X_{15,i-1} + K_{11,i}(T_{F,i} - T_{F,i-1}) \quad (26)$$

$$X_{16,i} = X_{16,i-1} + K_{12,i}(N_{E,i} - N_{E,i-1}) \quad (27)$$

$$X_{23,i} = X_{23,i-1} + K_{23,i}(N_{D,i} - N_{D,i-1}) \quad (28)$$

The variables $X_{15,i}$ and $X_{16,i}$ obtained by the equations (26) and (27), and the variable $X_{23,i}$ obtained by the equation (28) are then fed to the manipulated variable calculator 17.

It is noted that in the equations (26) to (28), the proportional terms are obtained from the difference between the current sampling data and the previous sampling data, so that the nonlinearity of the engine 2 can be taken into account.

Next, at the step 37, the manipulated variable calculator 17 calculates the throttle opening reference value $S_{R,i}$ and the dynamometer current reference value $I_{R,i}$ as follows:

$$S_{R,i} = X_{14,i} - X_{15,i} - X_{16,i} \quad (29)$$

$$I_{R,i} = X_{22,i} - X_{23,i} \quad (30)$$

The throttle opening reference value $S_{R,i}$ and the dynamometer current reference value $I_{R,i}$ so obtained are then fed to the throttle controller 6 and the dynamometer current controller 9, respectively, at the step 38, and the value of a suffix i labelling the sampling timing is increased by one at the step 39 in order to prepare for the next sampling timing.

As a result, the throttle of the engine 2 is controlled by the throttle opening controller 6 in accordance with the throttle opening reference value $S_{R,i}$, while the dynamometer 10 is controlled by the dynamometer current controller 9 in accordance with the dynamometer current reference value $I_{R,i}$, such that the rotational speed and the axial torque of the engine 2 is controlled to be equal to the reference values specified at the operation command generator 1.

Thus, in this embodiment, the system of the engine 2 and the dynamometer 10 is controlled as a two-inputs two-outputs system, using the rotational speed of the dynamometer 10 and the axial torque of the engine 2 as two of the inputs, and the throttle valve opening and the dynamometer current as two of the outputs. Consequently, a mutual interference between two controlled variables of the rotational speed and the axial torque of the engine to be tested can be avoided, so that a stable control operation becomes possible.

Moreover, because the manipulated variables are calculated with the nonlinearity of the engine 2 fully taken into account, the rotational speed and the axial torque can be controlled at the sufficiently high accuracy required by the engine test.

Furthermore, according to this embodiment, the control control gains can be determined from the characteristics of the engine 2 and the dynamometer 10, so that the manual operation such as an initial adjustment associated with the replacement of the engine 2 to be tested can be reduced.

Now, in the above embodiment, the rotational speed of the engine 2 is measured. However, this may be replaced by an estimated rotational speed $N_{E,E}$ of the engine 2 which can be obtained from the measured values for the axial torque $T_F$ and the rotational speed $N_D$ of the dynamometer 10, and the torsional rigidity coefficient $K_{SH}$ of the connecting axle, as follows:

$$N_{E,E} = (dT_F/dt) \cdot (1/K_{SH}) + N_D \quad (31)$$

Thus, the above embodiment may be simplified by using this estimated rotational speed $N_{E,E}$ of the engine 2 instead of the measured value of the rotational speed $N_E$ of the engine 2.

Here, because the torsional rigidity coefficient $K_{SH}$ of the connecting axle is usually vary large, so that the measured value of the rotational speed $N_D$ of the dynamometer 10 may be taken as the estimated rotational speed $N_{E,E}$ of the engine 2 by simply ignoring the first term in the equation (31), without sacrificing the accuracy too much.

It is to be noted that by increasing the number of inputs and outputs, the above embodiment can readily be extended to multi-inputs multi-outputs system.

Besides these, many modifications and variations of the above embodiments may be made without departing from the novel and advantageous features of the present invention. Accordingly, all such modifications and variations are intended to be included within the scope of the appended claims.

What is claimed is:

1. An apparatus for controlling an engine system in an engine characteristic test by performing at least integral and proportional control operations, said engine system including engine means for generating operational energy and dynamometer means connected to said engine means for generating power energy, said apparatus comprising:

means for detecting rotational speed of said engine means;
   means for detecting axial torque of said engine means;
   means for detecting said operational energy of said engine means;
   means for detecting rotational speed of said dynamometer means;
   engine control means for controlling said operational energy of said engine means;
   means for setting a predetermined rotational speed of said engine means and a predetermined axial torque of said dynamometer means;
   means for calculating a first difference between said predetermined rotational speed and said detected rotational speed of said dynamometer means, and a second difference between said predetermined axial torque and said detected axial torque of said engine means;
   means for calculating control gains based on a predetermined mathematical model corresponding to said engine system, from said detected operational energy, said detected axial torque and said detected rotational speed of said engine means and said detected rotational speed of said dynamometer means;
   means for calculating manipulated variables to perform at least integral and proportional operations, from said control gains, said detected operational energy and said detected axial torque of said engine means, said first difference and said second difference; and
   system control means for controlling said engine control means and said dynamometer means according to said manipulated variables.

2. The apparatus of claim 1, wherein said means for detecting operational energy comprises throttle detector means for detecting an opening of a throttle valve of said engine means.

3. The apparatus of claim 1, wherein said system control means includes means for controlling said dynamometer means.

4. The apparatus of claim 1, wherein said means for calculating said manipulated variables includes means for calculating integral terms and means for calculating proportional terms.

5. The apparatus of claim 4, wherein said means for calculating integral terms calculates said integral terms by first multiplying said differences and said control gains to obtain an integrand, and then integrating said integrand;
   said means for calculating proportional terms calculates said proportional terms by multiplying said control gains with differences between current sampling and previous sampling of measured values for said control gains; and
   said means for calculating said manipulated variables calculates said manipulated variables by adding said integral terms and said proportional terms.

6. A method of controlling an engine system in an engine characteristic test by performing at least integral and proportional control operations, said engine system including engine means for generating operational energy and dynamometer means connected to said engine means for generating power energy, said method comprising the steps of:

detecting rotational speed of said engine means;
   detecting axial torque of said engine means;
   detecting said operational energy of said engine means;
   detecting rotational speed of said dynamometer means;
   controlling said operational energy of said engine means by engine control means;
   setting a predetermined rotational speed of said engine means and a predetermined axial torque of said dynamometer means;
   calculating a first difference between said predetermined rotational speed and said detected rotational speed of said dynamometer means, and a second difference between said predetermined axial torque and said detected axial torque of said engine means;
   calculating control gains based on a predetermined mathematical model corresponding to said engine system, from said operational energy, said axial torque and said detected rotational speed of said engine means and said detected rotational speed of said dynamometer means;
   calculating manipulated variables to perform at least integral and proportional operations, from said control gains, said operational energy and said axial torque of said engine means, said first difference and said second difference; and
   controlling said engine control means and said dynamometer means by system control means according to said manipulated variables.

7. The method of claim 6, wherein at said step of detecting said operational energy, an opening of a throttle valve of said engine means is detected as said operational energy.

8. The method of claim 6, wherein said system control means includes means for controlling said dynamometer means.

9. The method of claim 6, wherein said step of calculating said manipulated variables includes a step of calculating integral terms and a step of calculating proportional terms.

10. The apparatus of claim 9, wherein
    at said step of calculating integral terms, said integral terms are calculated by first multiplying said differences and said control gains to obtain an integrand, and then integrating said integrand;
    at said step of calculating proportional terms, said proportional terms are calculated by multiplying said control gains with differences between current sampling and previous sampling of measured values for said control gains; and
    at said step of calculating said manipulated variables, said manipulated variables are calculated by adding said integral terms and said proportional terms.

* * * * *